Feb. 22, 1966  J. W. ACKLEY ETAL  3,236,456
SPRAYER
Filed Oct. 23, 1963 5 Sheets-Sheet 3
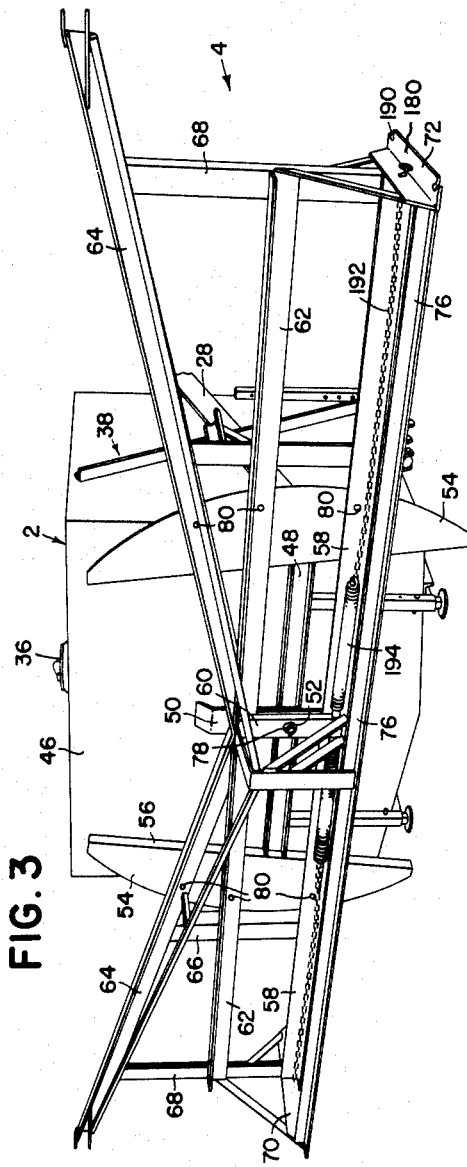
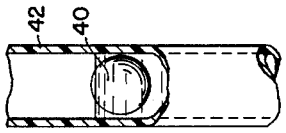
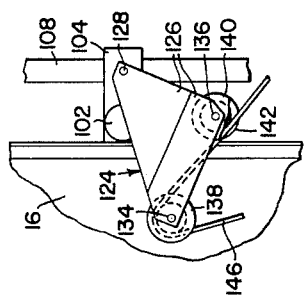
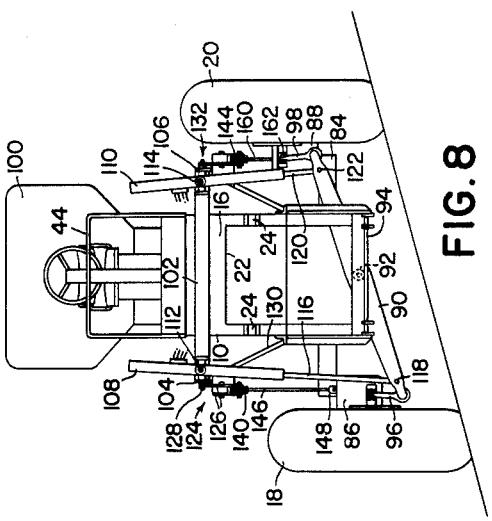
INVENTORS
JOHN W. ACKLEY, WILLIAM P. OEHLER &
CHARLES K. STRALOW
BY
ATTORNEY Feb. 22, 1966 J. W. ACKLEY ETAL 3,236,456
SPRAYER
Filed Oct. 23, 1963 5 Sheets-Sheet 4

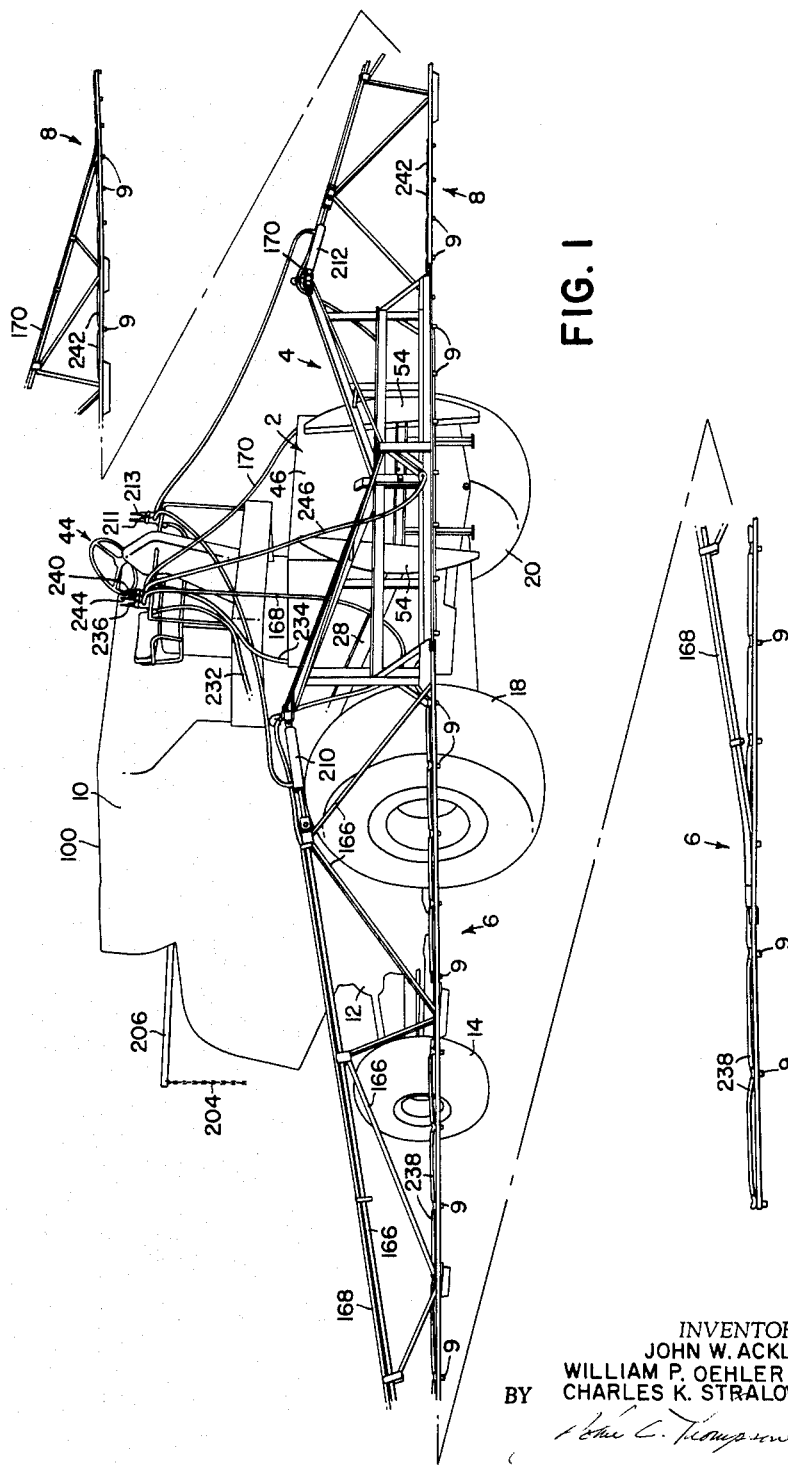

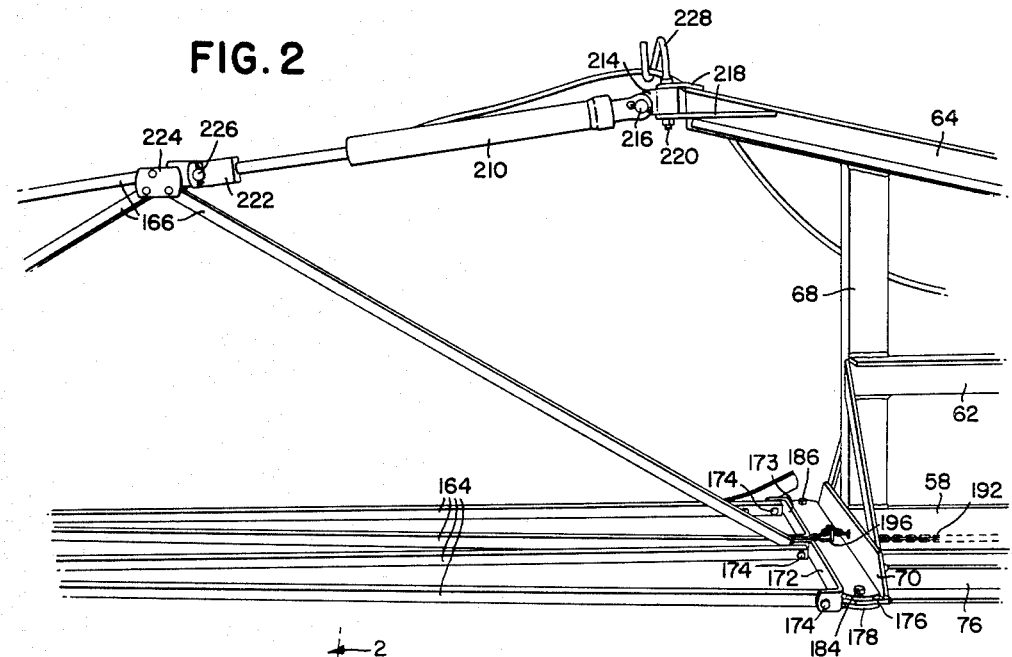
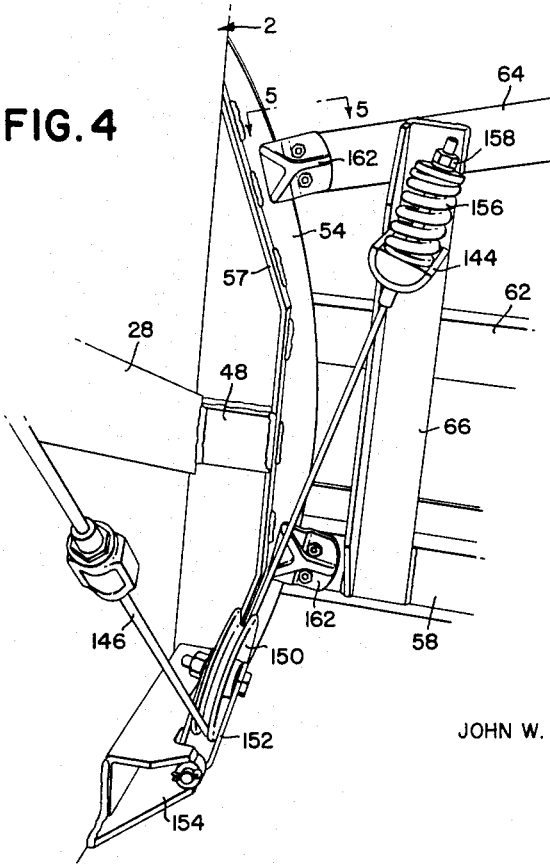
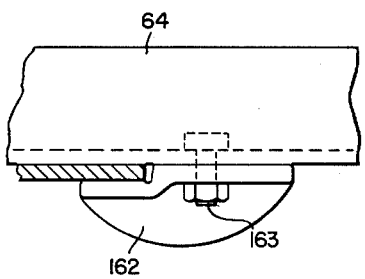

INVENTORS
JOHN W. ACKLEY, WILLIAM P. OEHLER &
CHARLES K. STRALOW
BY
*John C. Thompson*
ATTORNEY

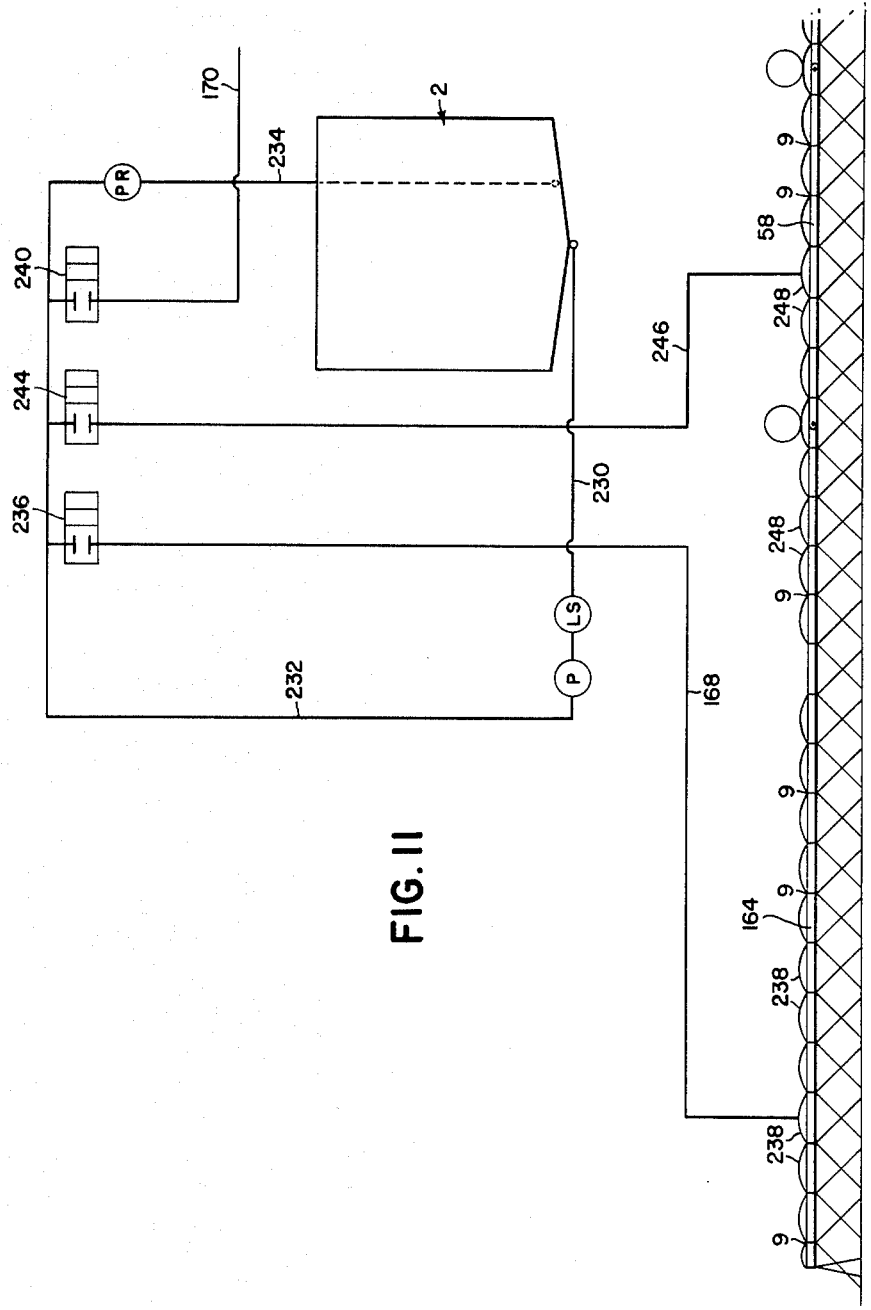

United States Patent Office 3,236,456
Patented Feb. 22, 1966

3,236,456
SPRAYER
John W. Ackley, William P. Oehler, and Charles K. Stralow, Moline, Ill., assignors to Deere & Company, Moline, Ill., a corporation of Delaware
Filed Oct. 23, 1963, Ser. No. 318,317
6 Claims. (Cl. 239—168)

The present invention relates generally to sprayers, and more particular to sprayer attachments for combines and the like.

It is an object of the present invention to provide a sprayer attachment for self-propelled combines and the like which will enable the operator of the combine to spray large acreages rapidly and efficiently.

Heretofore, when spraying large acreages, it has been the practice to employ either airplanes, or to use specialized spraying machines. The employment of airplanes has in many conditions proved unsatisfactory, especially where the land is rolling, or where strip farming is practiced. In these areas it is difficult to deposit the spray material evenly over the desired areas.

While specialized spraying machines have overcome the disadvantages of airplane spraying, these units are relatively expensive to operate since they can only perform a single function.

Therefore, it is an object of this invention to provide an attachment which can be easily mounted on and removed from a self-propelled combine or the like whereby the combine unit may be employed to carry either the conventional header and feeder housing, or a sprayer attachment of applicant's design. More specifically, it is an object of the present invention to provide a sprayer attachment for self-propelled combines or the like, said sprayer attachment having a central boom section rigidly mounted on the combine and outrigger sections pivotally secured to the central section, the pivoted outrigger sections being mounted for independent raising and lowering whereby the outrigger sections can more easily follow the contour of the land.

Another object of the present invention is the provision of a spray material supply system in which three manually controllable systems are employed, two of the controllable systems being mounted on the outrigger boom sections of the sprayer attachment, and the third controllable system being mounted on the central boom section and extending to the outer booms.

Another object of the present invention is to provide means for mounting the spraying boom on the spray tank in a novel manner. More specifically, it is an object of the present invention to provide means for mounting the sprayer boom on the spray tank whereby when the spray tank is mounted on a hillside or self-leveling combine the spray boom may follow the contour of the land while the spray tank moves with the body of the combine.

Another object of the present invention is the provision of mounting means whereby when the spray tank is mounted on a level land combine in which the body of the combine is not movable relative to the wheels, the central boom section can be easily secured nonrotatably to the spray tank.

Another object of the present invention is the provision of a transport lock for a sprayer attachment having a central boom and pivoted outrigger boom sections, the transport lock maintaining the outrigger booms in a folded back position.

Another object of the present invention is to provide an improved transparent liquid level gauge in which an easily perceivable marker is floated on the fluid in the transparent gauge tube.

These and other objects and advantages of the present invention will be apparent to those skilled in the art after a consideration of the following detailed description taken in conjunction with the accompanying drawings, in which:

FIG. 1 is a perspective view of the sprayer attachment of this invention mounted on a self-propelled combine.

FIG. 2 is a perspective view of the boom structure shown in FIG. 1, in which the mounting between the outer boom section and the central boom section is more fully illustrated.

FIG. 3 is a perspective view illustrating the manner in which the central boom section may be secured to the spray tank. The illustrated manner of mounting being preferable when the tank is mounted on a hillside combine.

FIG. 4 is a rear view of a portion of the central boom section and its associated tank mounting structure shown in FIG. 3.

FIG. 5 is a section taken along the line 5—5 of FIG. 4.

FIG. 8 is a front view of the combine with the sprayer attachment of this invention removed.

FIG. 9 is an enlarged fragmentary side view illustrating one of the body-carried guide means employed on a hillside combine.

FIG. 10 is an enlarged detail view of the liquid level for the spray tank, and

FIG. 11 is a schematic view illustrating the relationships between the spray distributing conduits and the boom sections.

Figure 6:
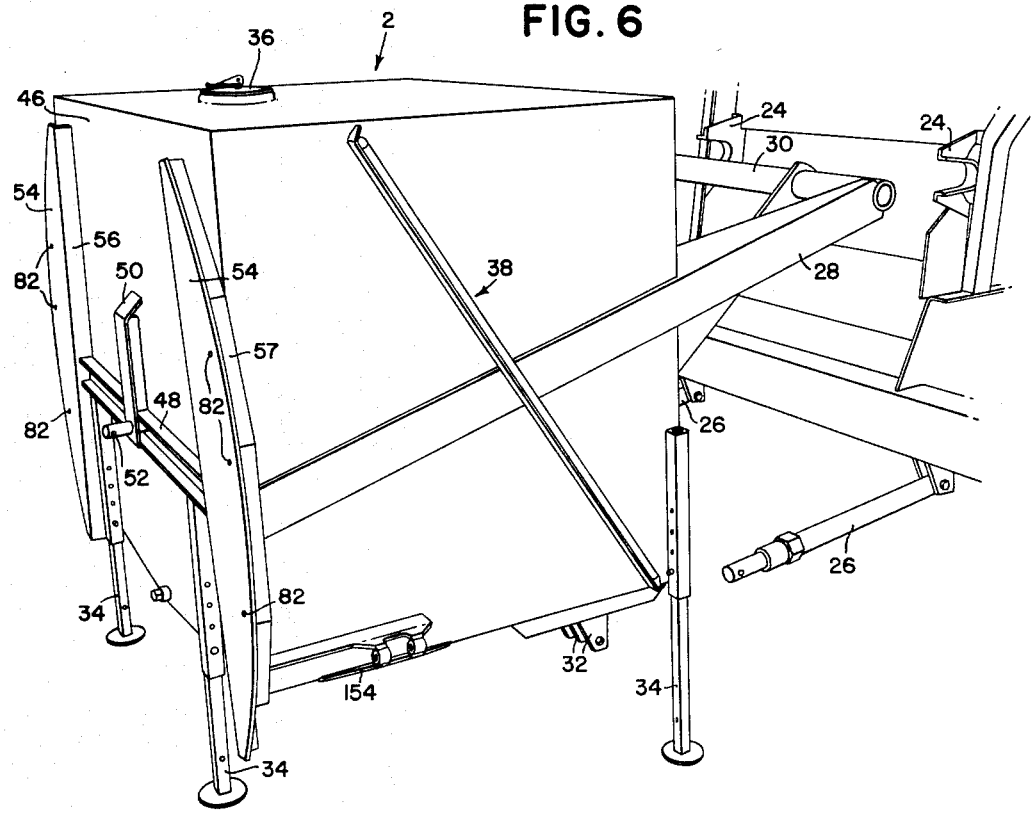
FIG. 6 is a view showing the manner in which the tank may be mounted on a combine.

In the following description right-hand and left-hand reference is determined by standing to the rear of the sprayer and facing the direction of travel.

A combine such as the type more fully illustrated in the U.S. patent to Knollman 3,065,590, is shown in FIG. 1 equipped with the sprayer attachment of this invention. The sprayer attachment includes, as will be more fully described below, a central tank 2 which is secured to the combine in substantially the same manner as the conventional feeder housing shown in the above patent. A center boom section 4 is carried on the forward wall of the tank 2 for optional rotational movement, and right- and left-hand outer boom sections 6 and 8, respectively, are secured at their inner ends to the central boom sections for pivotal movement about fore-and-aft and vertical axes. Mounted on the center and outer boom sections are a plurality of nozzles 9 which are interconnected with the spray material in the tank by suitable structure.

More particularly, referring first to FIGS. 1 and 8, the combine illustrated has a longitudinal or fore-and-aft body 10 carried at its rear end 12 (FIG. 1) on rear wheel means 14 and carried at its front end 16 (FIG. 8) on right- and left-hand wheel means 18 and 20 respectively. The expressions "right-hand" and "left-hand" are used with reference to the position of an observer standing behind the machine and facing forwardly. The body 10 typically contains threshing and separating mechanism (not shown) for handling grain or other crop fed thereto through the forward feed opening 22, (FIG. 8) which normally receives the crop from a transverse header and fore-and-aft feeder house (not shown).

The front end 16 of the combine is provided with a pair of transversely coaxial trunnions 24 which establish a transverse pivot axis, and as shown in FIG. 6 a pair of hydraulic cylinders 26. The trunnions normally receive a transverse pivot bar secured to the feeder house, and the cylinders 26 normally are secured at one end to the header and feeder house and vertically position them with respect to the body 10.

Secured to the central tank 2 of this invention is a pair of rearwardly extending arms 28 (FIG. 6) which carry at their outer ends a transverse pivot bar 30. According to the principles of the present invention the transverse pivot bar 30 is adapted to be secured within the trunnions 24 for rotation in a conventional manner and the cylinders 26 are adapted to be secured to the lugs 32 on the bottom of the tank 2. Thus, the tank is easily mounted on the combine in place of the usual header and feeder house. To further facilitate securement and removal the tank is provided with four corner legs or stands 34 which are employed to hold the tank at the proper height during installation and removal. The tank is provided with the usual tank lid 36 such as the type shown in U.S. Patent to John W. Ackley, 2,891,694 and a liquid level gauge 38.

It is one of the features of the present invention to provide indicator means within the liquid level gauge. It has been found that when the gauge tube 42 is made of polyethylene, as is necessary due to the corrosive nature of some of the fluids employed when spraying, it is difficult to perceive the level of the fluid within the tube, especially when viewed at a distance. To improve readability of the gauge a colored polyethylene ball 40 (FIG. 10) is disposed within the gauge tube 42 and floated on the top of the liquid surface. Polyethylene is the preferred material for the ball 40 since it is highly resistant to chemical attack by those chemicals normally employed in spraying, and it has a specific gravity below that of water and of the solutions used in spraying; more specifically, polyethylene has a specific gravity within a range of 0.92 to 0.96. A further advantage of polyethylene is that it is easily colored. Thus, in applicant's preferred embodiment, the ball is colored black and the level of the fluid in the tank can easily be perceived from the operator's station 44 of the combine.

The center boom section 4 is carried by the front wall 46 (FIG. 6) of the tank. To this end the front wall 46 is provided with a transverse frame member 48 and a vertically extending frame member 50 to which is rigidly secured at their intersection a forwardly projecting pivot pin 52. Radius plates 54 are mounted on the forward wall 46 by means of inner and outer spacer elements 56 and 57 respectively. As best shown in FIG. 3, the center boom section 4 includes in part a main transverse frame member 58, a vertically extending post 60 secured at its lower end to the frame member 58, a secondary transverse frame member 62, secured at its midportion to the upper end portion of the frame post 60, and upwardly and outwardly extending arms 64 extending from either side of the center of the frame member 62. The arms 64 are supported by inner and outer posts 66 and 68, respectively, which are secured at their lower ends to the outer ends of the frame member 58, and at an intermediate portion to the outer ends of the frame member 62. Secured to the outer ends of the main transverse frame member 58 are right and left L-shaped hinge plates 70, 72, respectively. These plates are suitably reinforced by rearwardly extending stays 74 (FIG. 7) and a forward rail 76. Other suitable reinforcing structure (no number) may be provided if desired. The vertically extending post 60 is apertured and receives the pivot pin 52, the post 60 and its associated framework being secured to the pin 52 for rotational movement by the quick-detachable pin 78. Alternatively, the center boom section can be fixed to the tank by means of the bolts 80 (FIG. 3) which are adapted to be passed through the apertures 82 (FIG. 6) in the radius plates. However, if the center boom section and tank are mounted on a hillside combine, such as shown in FIG. 8, it is desirable to have the section 4 rotate about the pivot pin 52 in response to the movement of the front wheels of the combine.

In the hillside combine of the type illustrated in FIG. 8, the forward end of the body 10 is provided with a subframe structure which includes a transverse shaft 84 on which the rear ends of the right- and left-hand arm means 86 and 88 are mounted for vertical swinging. Each arm extends forwardly of the pivot shaft and journals its front wheel means via any associated structure, not material here. Suffice it to note that the arm means 86 and 88 mount the wheels for vertical adjustment in opposition; that is, as one wheel goes up, the other wheel goes down. In a typical situation as represented in FIG. 8, there is an upward slope to the left (to the right of the reader) and the left-hand wheel is higher than the right-hand wheel. Equalization of the movement of the wheels is accomplished by a transverse equalizer 90 pivoted intermediate its ends at 92 on a fore-and-aft axis by means including a depending portion 94 of the subframe structure. The connection of opposite ends of the equalizer 90 to the front ends of the wheel arms 86 and 88 are articulate, as indicated respectively at 96 and 98.

The body 10 is illustrated as being provided with a conventional grain tank 100. Ahead of the grain tank 100 is a typical operator's station 44, which projects at the forward end 16 of the body 10 in overhanging relationship to the rear portion of the sprayer attachment as best seen in FIG. 1. Below the operator's station 44 is a transverse supporting structure including a beam 102, (FIG. 8) which has opposite ends providing left- and right-hand mounts 106 and 104 respectively, for right- and left-hand hydraulic rams 108 and 110, respectively. The mounts 104 and 106 include both fore-and-aft and transverse pivot axes as at 112 and 114 to provide for the requisite freedom of motion of the rams, it being clear of course that the beam 102 is rigid on the body and the rams themselves are non-axially displaceable relative to the beam. The right-hand ram 108 has a piston (not shown) the rod 116 of which is pivotally connected at 118 to the right-hand end of the equalizer 90. Similarly, a piston rod 120 of the left-hand ram 110 is pivotally connected at the left-hand end of the equalizer 90 at 122. The rams are powered in opposition so that extension of one and simultaneous retraction of the other causes the wheel means 18 and 20 to change positions according to the slope. The means may be automatic in response to appropriate leveling means not important here. A representative automatic leveling means is shown in U.S. patent to Vogelaar 2,801,511.

In the type of combine illustrated for the purpose of causing the header to accommodate itself to the slope encountered by the wheels 18 and 20, there is provided at each side of the machine a header control means. This control means is employed when the sprayer attachment of this invention is mounted on the combine body to cause the sprayer boom to accommodate itself to the slope encountered. The control means for the right-hand side will be described first.

This means includes support means designated in its entirety by the numeral 124, best shown in substantial isolation from the remainder of the machine in FIG. 9. This support means may be of any suitable structure, such as a pair of plates 126 rigidly secured together and rigidly mounted on the right-hand side of the body in the general area of the feeder house trunnion 24. This means 124 is in laterally overhanging relationship to the forward portion of the right-hand wheel arm means 86 and is suitably connected to the right-hand mount 104 for the right-hand ram 108, as at 128, and is additionally braced by supporting structure at 130 to a lower forward portion of the proximate side of the body. The left-hand side of the machine is provided with a similar support means, designated in its entirety at 132, and is similarly and symmetrically constructed. The two support means are therefore rigid parts of the body and are thus isolated from the movable feeder house and header.

The right-hand support means 124 has a rearward portion 134 and a forward portion 136, and in these portions are respectively journaled first and second or rear and front sheaves 138 and 140. The axis of the sheave 140 is located above and slightly forward of the axis defined by the trunnions 24 so that a lower part of the sheave 140, as at 142, is in substantial register with the trunnion axis. The purpose of this arrangement will be clear from the following description. It will be understood, of course, that a similar arrangement exists at the opposite side of the machine in the support means 132.

At the right-hand side of the machine, a flexible tension element, here in the form of a cable 146, is connected at one end at 148 (FIG. 8) to a forward portion of the right-hand wheel arm means 86 and extends thence upwardly and is trained over the rear sheave 138 (FIG. 9) and then extends forwardly under the front sheave 140, engaging this sheave at its lower portion of its periphery as described at 142. The cable extends thence downwardly and forwardly and under a third sheave 150 (FIG. 4) and thence upwardly to a connector 144 on the inner post 66 of the center boom section 4. The sheave 150 is mounted on a pivoted support 152 which is in turn mounted on a bracket 154 carried by the tank 2. The connector 144 includes yielding cushioning means in the form of a coiled compression spring 156 to which the upper forward end of the cable is anchored at 158. The cable is thus tensioned between the anchor point at 148 on the arm 86 and is trained through the guide means established by the several sheaves, and is again anchored at its opposite end at 144–158 on the central boom section at the right-hand side. A similar cable 160 is anchored at 162 (FIG. 8) to the left-hand wheel arm 88 and is trained thence over the left-hand sheaves that correspond to the right-hand sheaves 138 and 140. The cable extends thence forwardly through a third sheave that corresponds in function, position and structure to that described at 150, and the cable 160 extends thence up to the left-hand connector.

The control of the spray boom to partake of the movement of the wheels 18 and 20 should be obvious from the foregoing description, however, it should be noted that a more complete description of the control mechanism is set forth in the Knollman Patent No. 3,065,590 mentioned above.

As the central boom section is moved about the pivot pin 52 by means of the right- and left-cable controls, 146 and 160, respectively, it is held for sliding contact along the radius plates 54 by means of bracket plates 162 (FIGS. 4 and 5) which are secured to the main transverse frame member 58 and the upwardly and outwardly extending arms 64 by means of conventional securing means, as for example, by bolts 163.

The right- and left-hand outer booms 6 and 8, respectively, are substantially identical, being in fact mirror images. Each boom is of a truss-reinforced construction having lower members 164 (FIG. 2) one of them being adapted to support a plurality of spaced apart nozzles 9, and upper members 166, the uppermost members 166 being adapted to support right- and left-hand fluid conduits 168 and 170, respectively as best seen in FIG. 1. As previously mentioned, the outer booms 6 and 8 are secured at their inner ends to the central boom section for pivotal movement about fore-and-aft and vertical axes. To this end front and rear generally U-shaped members 172 and 173, respectively, are pivotally secured to the inner ends of the lower members 164 by means of pivot bolts 174. Rigidly secured to the inner bight surfaces of the U-shaped members 172 and 173 are upper and lower spaced apart plate members 176 and 178, respectively, which are adapted to receive between them the outwardly projecting flange 180 of L-shaped members 70 and 72 (FIGS. 2 and 7), which are secured to the outer lower ends of the central boom section 4. Front and rear pivot studs 184 and 186, respectively, are secured to the plates 176, 178 and are adapted to be disposed in front and rear slots 188 and 190. The slot 188 extends from the outer edge of the flange 180 inwardly and rearwardly and the slot 190 extends from the outer edge inwardly and forwardly as can best be seen from FIG. 7. The inner portions of the slots are therefore spaced more closely together than the outer portions. The distance between the outer portions being greater than the distance between the studs 184, 186, and the distance between the inner portions of the slots being less than the distance between the studs. The distances between the studs, between the outer portions, and between the inner portions are so related that when a stud is disposed in the innermost position of one slot the other stud can clear the outer portion of the other slot. The studs 184 and 186 are normally held within the slots 188 and 190, respectively, by means of a chain 192 and spring 194, the chain engaging the lug 196 on the upper plate member 176 and drawing the plate member and its associated structure inwardly due to the action of the spring 194. In the assembled position, as best shown in FIG. 2, both studs are disposed within the slots, however, if the boom should hit an obstruction during spraying it would be able to swing back pivoting about the axis defined by the stud 186. To this end, however, it would first be necessary for the front stud 184 to be cammed past the overhanging front portion 198 drawing the rearward stud 186 further into the slot 190. When the boom swings forwardly after passing an obstruction, due to the action of the spring 194, the stud 184 will enter the slot 188. The momentum of the boom will then tend to cause the rear stud 186 to leave the slot 190, but before the stud can clear the slot 190 the boom structure must be caused to shift rearwardly to permit the stud to clear the overhang 200. Thus, this particular construction keeps both studs from being pulled out of their cooperating slots at the same time, and adds resistance to pivoting in that the studs must be cammed past their respective overhangs before swinging is possible. This resistance to pivoting is particularly advantageous in that swinging of the booms as the apparatus traverses rough terrain is controlled, and rebounding of the booms after obstructions are encountered is materially reduced.

Figure 7:
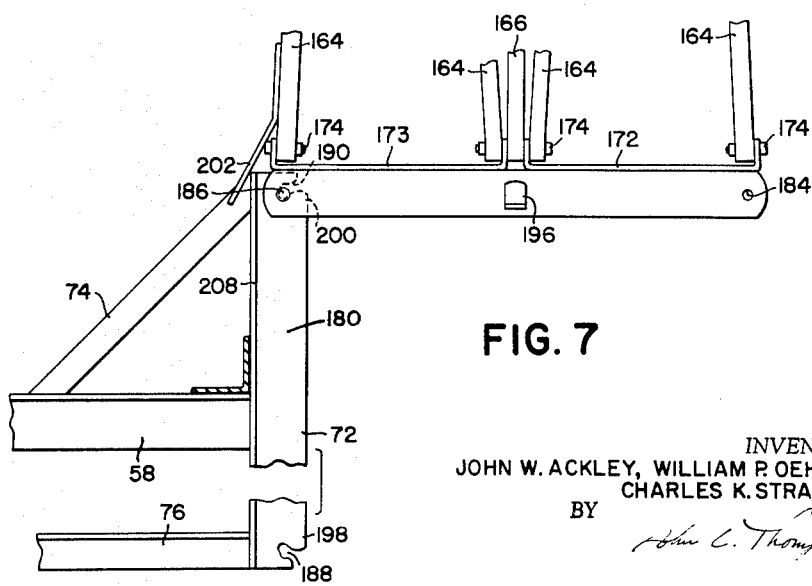
FIG. 7 is a view illustrating the boom hinge when the outer boom is held in its transport position.

It is a further feature of applicant's hinge construction to provide a transport lock 202 for each of the outer booms 6 and 8 as best shown in FIG. 7. Thus when an outer boom is held in its transport position by the chain 204 (FIG. 1) on the boom transport rail 206, the transport lock 202 engages the flange 208 on the L-shaped member 70 or 72. Since the distance between the lock 202 and the lip 200 of the slot 190 is greater than the distance between the lock 202 and the stud 186 when the outer boom is in its transport position, the outer boom is effectively locked to the central boom section when in its transport position.

It has been found that due to the rather extensive length of the boom, one commercial embodiment being 66 feet long, it is necessary to provide means to either raise or lower the outer ends of the booms. The reason for this is that in some instances the rolling nature of the land requires that either the outer ends of the booms be raised or lowered with respect to the ground to maintain the ends of the boom at a more even distance above the ground surface. To this end the hydraulic cylinders 210 and 212 are provided. These cylinders which may be either of the double acting or of the single acting type, are controlled by the operator of the combine from the operator's station 44 by conventional control means 211 and 213. To raise and lower the right- and left-hand outer booms 6 and 8, respectively, about the fore-and-aft extending axes defined by the pivot bolts 174, it is only necessary to cause the right- and left-hand hydraulic cylinders 210 and 212 to be either retracted or extended. The inner end of each of the cylinders are connected to a first bracket 214 (FIG. 2), about a fore-and-aft extending axis defined by the pivot pin 216, the first bracket being in turn secured to outwardly extending apertured flanges 218 about a pivot member 220. The outer end of the cylinder carries a U-shaped element 222 which is in turn pivotally secured to a plate 224 about pin 226, the plate 224 being carried by the upper members 166.

The upper end of the pivot member 220 is formed into a pig-tail 228 to carry a portion of the conduit 168.

Referring now to FIG. 11 in which the spraying apparatus is somewhat schematically illustrated, it can be seen that the spray material is drawn from the bottom of the central tank 2 by means of a supply hose 230 which is connected at its other end to the line strainer LS and the spray pump P. A pump hose 232 interconnects the pump with a plurality of manually operable valves connected in parallel and a pressure relief valve PR which is in turn connected with the tank 2 by means of a bypass hose 234. Each of the valves controls a separate series of interconnected nozzles on the sprayer attachment, and to this end the right-hand valve 236 controls through the right-hand conduit 168 those nozzles mounted on the right-hand boom which are interconnected by the short lines 238; the left-hand valve 240 controls through the left-hand conduit 170 those nozzles mounted on the left-hand boom which are interconnected by the short lines 242 (FIG. 1); and the central control valve 244 controls through the central conduit 246 those nozzles 9 mounted on the central boom section and both the right- and left-hand boom sections which are interconnected by the short hoses 248.

The valves 236, 240, and 244 are mounted at the operator's station 44 for convenient operation as can best be seen from FIG. 1, and thus the operator may control the flow through the nozzles 9 by means of the aforementioned valves.

To mount the sprayer attachment of this invention on a combine it is only necessary to remove the header and feeder housing which are normally mounted on the combine and to secure the tank 2 to the front end 16 of the combine body 10 by securing the transverse pivot bar 30 in a conventional manner to the trunnions 24, and to secure the hydraulic cylinders 26 to the lugs 32 on the tank 2. In this manner the tank 2 is secured to the combine body 10 in the same manner as the conventional feeder housing. The pump P is preferably driven from a PTO on the combine.

If the combine is of the level land type, as opposed to the hillside type, it is only necessary to secure the central boom section 4 to the pivot 52 and the radius plates 54 by means of bolts passing through the apertures 82.

However, if the sprayer attachment is to be mounted on a hillside combine it is necessary to permit the central boom section to swing about the pivot 52. To this end the control means to raise and lower the outer ends of the boom must be interconnected with those control means normally found on the hillside combine. To this end the cable 146 which normally interconnects the header with the feeder house for controlled rotational movement is secured to the central boom section by means of the connector 144 on the central boom section and the pivoted third sheave 150. When the body of the combine equipped with the spray tank 2 of this invention moves with respect to the land wheels 18 and 20 as it traverses over uneven ground, the tank 2 will move with the body 10 of the combine. However, the sprayer boom will follow the plane of the land as defined by the wheels 18 and 20 in the same manner as will the header of the normal hillside combine.

The manner in which the combine is removed should be obvious from the foregoing disclosure, however, it should suffice to note that when it is desirable to remove the sprayer attachment it is only necessary to lower the legs 34 until they contact the ground and to lock them in ground-contacting position, to disconnect the cylinders 26 from the lugs 32, and to disconnect the transverse pivot bar from the trunnions 24 to disconnect the pump and control valves, and back the combine away.

While we have shown and described above a preferred structure in which the principles of this invention have been incorporated, it is to be understood that our invention is not to be limited to the particular details shown and described above, but that, in fact, widely different means may be employed in the practice of the broader aspects of our invention.

We claim:

1. A sprayer attachment adapted to be mounted on a self-propelled combine, said attachment including a tank, means adapted to secure said tank to said combine, a pair of radius plates mounted on said tank, a center boom, means to secure said center boom to said tank, said last-mentioned means comprising pivot means mounted on a forward portion of said tank between said radius plates and engageable with a central portion of said center boom, and means engageable with said radius plates and portions of said center boom disposed to the sides of said central portion to hold said center boom to said radius plates.

2. The invention set forth in claim 1 in which said last-mentioned means are a plurality of bolts securable within cooperating apertures in said radius plates and said center boom.

3. The invention set forth in claim 1 in which said last-mentioned means are a plurality of bracket plates adapted to engage the outer edge of said radius plates, all portions of said outer edge being disposed substantially an equal distance from said pivot means.

4. A sprayer attachment adapted to be mounted on a self-propelled hillside combine having a fore-and-aft body including a front end supported by transversely spaced wheel means relatively vertically adjustable in opposition and carried by rockable arm means, said attachment including a tank, means adapted to secure said tank to the body, pivot means mounted on a forward portion of said tank, a pair of radius plates mounted on opposite sides of said pivot means, a center boom, means securing said center boom to said pivot means, means mounted on said center boom and adapted to slidingly engage the radius plates, means engageable with the center boom and responsive to vertical movement of the wheels to cause said boom to rotate with respect to said tank about said pivot means.

5. The invention set forth in claim 4 further characterized by right- and left-hand outer booms being pivotally secured about fore-and-aft extending axes to outer portions of said center boom, and independent means to raise and lower said outer booms about said pivots.

6. The invention set forth in claim 5 in which said outer booms are additionally mounted for swinging movement to and from a transport position about generally vertically extending axes, and lock means are provided to hold said outer booms in their transport position.

References Cited by the Examiner

UNITED STATES PATENTS

| | | | |
|---|---|---|---|
| 681,577 | 8/1901 | Pomeroy | 16—183 |
| 912,966 | 2/1909 | Lamiell et al. | 239—167 |
| 1,286,046 | 11/1918 | Marks | 73—32 |
| 2,221,433 | 11/1940 | Pitner | 239—168 |
| 2,305,913 | 12/1942 | Troyer | 239—168 |
| 2,532,996 | 12/1950 | Clark | 16—183 |
| 2,548,209 | 4/1951 | Foster | 287—96 |
| 2,596,473 | 5/1952 | Essick | 239—164 |
| 2,610,076 | 9/1952 | Walsh | 287—96 |
| 2,614,884 | 10/1952 | Essick | 239—168 |
| 2,712,198 | 7/1955 | Smith | 239—164 |
| 2,765,195 | 10/1956 | Hodges | 239—167 |
| 2,833,148 | 5/1958 | Hoyt et al. | 73—323 |
| 3,117,725 | 1/1964 | Palmer | 239—168 |

FOREIGN PATENTS

| | | |
|---|---|---|
| 154,595 | 12/1943 | Australia. |
| 733,236 | 7/1955 | Great Britain. |

EVERETT W. KIRBY, *Primary Examiner.*